United States Patent Office 2,890,169
Patented June 9, 1959

2,890,169
DRILLING FLUID FOR WELLS

Charles L. Prokop, Houston, Tex., assignor, by mesne assignments, to Jersey Production Research Company, Tulsa, Okla., a corporation of Delaware No Drawing. Application March 26, 1956
Serial No. 573,629

6 Claims. (Cl. 252—8.5)

The present invention is directed to an improved drilling fluid composition for oil and gas wells and the like. More specifically, the invention is directed to an improved composition and a method for using same in drilling oil and gas wells and the like. In its more specific aspects, the invention is directed to an improved drilling fluid composition and a method for using same in well bores.

The present invention may be briefly described as a drilling fluid composition for oil and gas wells and the like which comprises an emulsified slurry of cement in a hydrocarbon and a filtration reducing amount of Bentone.

The invention also involves a drilling method in which oil and gas wells and the like are drilled and the walls of the resulting borehole are provided with an impervious sheath so as to eliminate fluid migration into the penetrated formations and to prevent the hole from caving, spalling or sloughing. In practicing the present invention, drilling operations are conducted with a drilling fluid of water emulsified into an oil-Bentone-cement slurry. In such operations, the emulsified slurry is forced down the hollow drill stem and out through the eyes of the bit and up the annulus between the drill stem and the walls of the borehole to the earth's surface for flow into the pit or tanks used to contain the drilling fluid and then back into the drill stem.

In the present invention, a sheath of the drilling fluid is deposited on the walls of the borehole leaving a filter cake of deposited solids thereon. As filtration from the emulsified slurry proceeds into porous or permeable formations, the emulsion is broken releasing the water contained therein for contact with the cement of the filter cake and to react therewith to form an impervious sheath lining the bore opposite permeable or porous zones. In other words, in the practice of the present invention, the drilling fluid comprises an emulsified slurry of cement and Bentone which carries its own water for setting of same to form a strong sheath.

The composition of the present invention may consist essentially of the following components as set out in Table I:

Table I

| | Parts by weight |
|---|---|
| Oil | About 300 to 700. |
| Bentone | About 10 to 50. |
| Bentonite | About 20 to 60. |
| Cement | About 100 to 700. |
| Alcohol | About 1 to 10. |
| Water | About 5 to 280 (5% to 40% by wt. based on the cement). |
| Emulsifying agent | About 1 to 5. |

The hydrocarbon employed in the composition and the method may suitably be crude petroleum and fractions thereof; for example, the fractions may be a heavy naphtha, such as one boiling from about 300° to 600° F., kerosene, diesel oil, light lubricating oil fractions, and the like.

The cement employed in the present invention may suitably be Portland cement but may include other cementing materials, such as pozzolan and lime mixture, and sand and lime mixture, which may be especially useful in deep well cementing. It is anticipated that plaster of Paris, and the like may be used in shallow wells and for special jobs.

Bentone is the reaction product of organic bases with bentonite. The reaction is a base exchange reaction. Bentone may be prepared by treating a water slurry of high-grade sodium bentonite with one of the larger quaternary ammonium complexes, for example the water soluble salts, such as octadecylammonium chloride or dioctadecylammonium chloride, and the like. An ion exchange reaction takes place to produce a flocculated organophilic bentonite. This product, commonly called a Bentone, is recovered by filtering, washing, drying, and re-grinding. A description of the Bentones may be found in Chemical Engineering, March 1952, pages 226 to 230. Other bentonitic-containing material may be reacted with the larger quaternary ammonium complexes to form Bentone and like materials.

The emulsifying agent employed in the practice of the present invention may be selected from any one of a large number of emulsifying agents. As examples of emulsifying agents may be mentioned sorbitan monostearate, sorbitan mono-oleate, sorbitan sesqui-oleate, polyoxyethylene sorbitol tetra-oleate, polyoxyethylene sorbitol penta-oleate, oleic acid, and other of the organic salts or reaction products of the fatty acids, and the like materials having emulsifying characteristics.

The alcohol employed in the present invention is suitably used as a solvation agent and may include aliphatic alcohols, such as methyl alcohol, ethyl alcohol, propyl and butyl alcohols and the like. Other solvation agents may be ethylene glycol monoethyl ether, diethylene glycol monoethyl ether, the ketones, such as acetone, methyl ethyl ketones and other ketones of the same homologous series. The aliphatic alcohols and other compounds used as solvation agents in the practice of the present invention are used in the sense of the solvation agent referred to in the paper "Organophilic Bentonites, Swelling in Organic Liquids," by John W. Jordan, The Journal of Physical and Colloid Chemistry, vol. 53, No. 2, February 1949, and in the article "Organophilic Bentonites II—Organic Liquid Gels," by J. W. Jordan, B. J. Hook and C. M. Finlayson, The Journal of Physical and Colloid Chemistry, vol. 54, No. 8, November 1950. It is postulated that as the oil and Bentone are mixed, the oil moves into the interstitial spaces of the Bentone aggregate causing the Bentone particles to swell. It is thought that the principal function of the solvation agent or alcohol may be to speed up the movement of the oil into the interstitial spaces.

In practicing the present invention in drilling wells, a slurry of the cement, Bentone and oil is formed and then has water and an emulsifying agent added thereto and the mixture stirred for a sufficient length of time. Drilling operations are then conducted using the rotary drilling method in which a hollow drill stem carrying a drill bit on its lower end is rotated to form a borehole. As the drill bit is rotated forming the borehole, the composition of the present invention is circulated down the hollow drill stem and out through the eyes of the bit and up the annulus between the drill stem and the walls of the borehole. The drilling fluid of the present invention forms a sheath on the walls of the borehole and opposite permeable and/or porous formations. Filtration causes the emulsion to break which releases the water to react with the cement in the slurry which causes the cement to set up and form a sheath of sufficient strength to maintain the walls of the borehole against caving, spalling or sloughing.

This employment of a cement slurry which contains water emulsified in the oil provides the cement slurry with its own water or water in situ to cause setting up of the cement in the filter cake. By virtue of the fact that the water is emulsified in the oil, the water does not contact or react with the cement in the emulsified slurry until the emulsion is broken by filtering fluid from the slurry into permeable formations. In other words, the filter cake will spontaneously set up and does not depend on contact with water from the formation or from water added to the borehole.

The present invention is, therefore, of considerable utility in the drilling of oil and gas wells and the like. The present invention has further utility in that the formation of a sheath on the walls of the borehole which immediately sets up on loss of fluid from the emulsion causes zones where fluid is rapidly lost to be sealed. These zones are usually termed in the art as zones of lost returns or lost circulation and will include all zones which are highly permeable, porous, fractured, or fissured, or zones where caving occurs or where cavernous spaces are easily formed. By providing a filter cake to sheath the walls of the well bore, drilling operations may be conducted without interruption or loss of drilling time past highly permeable zones since at such locations in a borehole the present invention is particularly useful and the cement rapidly sets up.

The present invention will be further illustrated by the following examples:

A drilling mud termed A was made up by admixing 690 volumes of East Texas crude with 20 parts by weight of Bentone and 7 volumes of methanol by stirring the crude Bentone with methanol for one hour. Thereafter the composition was added to 125 parts by weight of cement and stirred for an additional 30 minutes. 300 volumes of this prepared mud A then was admixed with 3 volumes of an emulsifying agent of the type mentioned and 100 volumes of water and the entire mixture then stirred for 30 minutes for forming an emulsion. Thereafter, the emulsion was tested with the following results being obtained:

*Table II*

| | |
|---|---|
| Plastic vis. | 35 centipoises. |
| Yield point | 60#/100 sq. ft. |
| API filtration rate: | |
| 30 min. | 3.5 cc. |
| 17 hrs. | 11.0 cc. |
| 25 hrs. | 12.0 cc. |
| 43 hrs.[1] | 13.8 cc. |

[1] Mud still fluid.

In another operation, 690 volumes of East Texas crude, 20 parts by weight of Bentone, 40 parts by weight of bentonite, and 7 volumes of methanol were stirred for one hour to form a slurry. The slurry was then added to 125 parts by weight of cement and stirred an additional 30 minutes. 300 volumes of the thus prepared drilling fluid had added to it 3 volumes of emulsifying agent and 100 volumes of water and the mixture stirred for 30 minutes to form an emulsion. The emulsion was then tested to obtain the following results:

*Table III*

| | |
|---|---|
| Plastic vis. | 55 centipoises. |
| Yield point | 30#/100 sq. ft. |
| API filter loss: | |
| 30 min. | 5 cc. |
| 16.5 hrs. | 17.5 cc., all oil. |
| 24.7 hrs. | 19.0 cc. |
| 42.5 hrs.[1] | 20.0 cc., trace $H_2O$. |

[1] Mud still fluid.

Another drilling fluid was prepared by taking 300 volumes of prepared drilling fluid A and adding 200 parts by weight of Portland cement thereto and stirred 10 minutes. 3 volumes of emulsifying agent and 100 volumes of water were then added and the entire mixture stirred for 30 minutes to form an emulsion. The tests on this emulsion are presented in Table IV:

*Table IV*

| API filter loss: | Cc. |
|---|---|
| 30 min. | 4.0 |
| 3.3 hrs. | 8.0 |
| 21 hrs.[1] | 19.5 |
| 24.7 hrs. | |

[1] Mud still fluid; compact ¼″ cake; mud sample rolled in oven at 140° F. for 24 hrs.—no deterioration of mud properties.

Another drilling fluid was prepared by admixing 690 volumes of East Texas crude, 20 parts by weight of Bentone, 7 volumes of methanol by stirring for 1 hour. Thereafter the slurry was added to 500 parts by weight of Portland cement, stirred for an additional 30 minutes and the cement slurry then added to 250 volumes of water and 4 volumes of oleic acid and stirred for 30 additional minutes to form an emulsion. The tests on this emulsion are presented in Table V:

*Table V*

| API filter loss: | |
|---|---|
| 30 min. | 1.5 cc. $H_2O$, 8.5 cc. oil. |
| 2 hrs. | 4 cc. $H_2O$, 16.8 cc. oil. |
| 21 hrs. | 8 cc. $H_2O$, 38.8 cc. oil. |
| 24 hrs. | Mud fluid, compact ¼″ cake. |

It will be seen from the results presented in Tables II to V, inclusive, that the compositions of the present invention form drilling fluids which have thin cakes, low filtration losses, and, therefore, desirable properties for forming a sheath on the walls of a well bore.

Thus the present invention is advantageous in that drilling fluid is provided which forms a strong sheath on the walls of a well bore and has the advantage of carrying its own water such that it will spontaneously set up on contact with a porous or permeable formation and which does not depend on water contact, either by interstitial water in the formation pores or by water provided in the well bore.

The nature and objects of the present invention having been completely described and illustrated, what I wish to claim as new and useful and to secure by Letters Patent is:

1. A water in oil emulsion suitable for use in drilling oil and gas wells and the like which consists essentially of cement, a reaction product resulting from treating a water slurry of high grade sodium bentonite with one of the long chain quaternary ammonium compounds capable of forming a complex with the bentonite to form a product capable of swelling in oil, oil, and water, said cement, reaction product, oil, and water being present in amounts in the range, respectively, between about 100 to 700 parts by weight, about 10 to 50 parts by weight, about 300 to 700 parts by weight, and about 5 to 280 parts by weight.

2. A method for drilling oil and gas wells and the like which comprises rotating a hollow drill stem having a drill bit on its lower end to form a borehole in the earth's surface while circulating down the drill stem and out the eyes thereof and up the annulus between the walls of the borehole and the drill stem a composition consisting essentially of cement, a reaction product resulting from treating a water slurry of high grade sodium bentonite with one of the long chain quaternary ammonium compounds capable of forming a complex with the bentonite to form a product capable of swelling in oil, oil, water, and an emulsifying agent, said composition being emulsified with the water as the internal phase and containing said cement, reaction product, oil, and emulsifying agent in amounts in the range, respectively, between about 100 and about 700 parts by weight of cement, about 300 to about 700 parts by weight of oil, about 10 to about 50 parts by weight of the reaction product and about 1 to about 5 parts by weight of the emulsifying agent, whereby an impervious sheath is formed on the walls of said borehole opposite permeable formations.

3. A method in accordance with claim 2 in which the composition contains bentonite and a solvation agent for the reaction product.

4. A method in accordance with claim 2 in which the cement is Portland cement.

5. A method in accordance with claim 2 in which the composition contains a solvation agent.

6. A method in accordance with claim 2 in which the emulsifying agent is an organic salt of a fatty acid.

References Cited in the file of this patent

UNITED STATES PATENTS

| | | |
|---|---|---|
| 2,065,512 | Cannon | Dec. 29, 1936 |
| 2,380,156 | Dobson et al. | July 10, 1945 |
| 2,531,812 | Hauser | Nov. 28, 1950 |
| 2,582,459 | Salathiel | Jan. 15, 1952 |
| 2,675,353 | Dawson | Apr. 13, 1954 |
| 2,689,219 | Menaul | Sept. 14, 1954 |
| 2,776,010 | Rike | Jan. 1, 1957 |
| 2,776,112 | Ilfrey et al. | Jan. 1, 1957 |
| 2,798,003 | Morgan et al. | July 2, 1957 |